Feb. 16, 1954 W. C. MORROW 2,668,995
CONNECTOR CLAMP
Filed March 7, 1949

*INVENTOR.*
WALKER C. MORROW
BY Whittemore
Hulbert & Belknap
ATTORNEYS

Patented Feb. 16, 1954

2,668,995

UNITED STATES PATENT OFFICE 2,668,995

CONNECTOR CLAMP

Walker C. Morrow, Dearborn, Mich.

Application March 7, 1949, Serial No. 80,007

6 Claims. (Cl. 24—81)

The present invention relates to a connector clamp and more particularly to a clamp designed to interconnect structural members such for example as a tubular structural member and a nailing strip.

It is an object of the present invention to provide a connector clamp characterized by its simplicity, the economy with which it may be produced, its ease of operation and the efficiency with which it functions to retain a nailing strip in assembled relation with a structural element such for example as a tubular structural element or an I-beam or the like.

Other objects and features of the invention will become apparent as the description proceeds, especially when taken in conjunction with the accompanying drawings, wherein.

Figure 2:
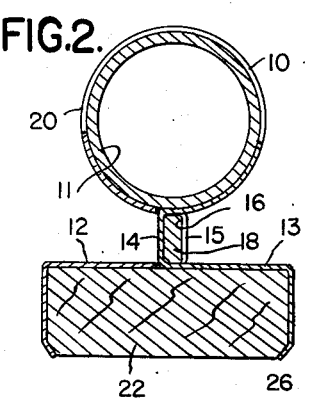
Figure 2 is a section on the line 2—2, Figure 1.
Figure 1:
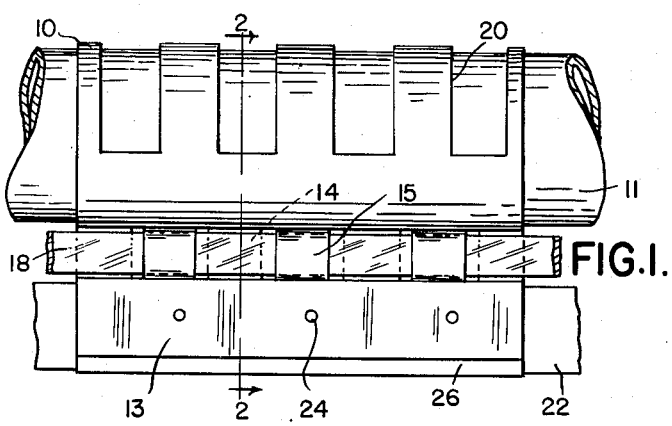
Figure 1 is a side elevation partly in section showing a connector clamp used to assemble a nailing strip to a tubular structural member.

Referring first to Figures 1 and 2 the connector clamp comprises a unitary member formed from sheet metal having one end portion 10 shaped to circular configuration to grip a tubular structural member 11. The opposite end of the clamp is provided with a pair of like jaws 12 and 13. Intermediate the circular end portion 10 and the jaws 12 and 13 the clamp is provided with looped portions 14 and 15 which are adapted to interfit so as to define a keyway 16 for the reception of a locking and clamping key indicated at 18.

In order to facilitate assembly of the clamp with the parts with which it is associated, preferably the circular end portion 10 of the clamp has cutaway slots indicated at 20 to increase the flexibility of the member, to permit it to be applied to an intermediate portion of the tube and bent around it. The looped portions 14 and 15 are several in number and are formed by straps separated by slots of equal width staggered so as to interfit in the manner best illustrated in Figure 1. In use, and with the key 15 removed, the ends of the jaws 12 and 13 may be spread, thus simultaneously increasing the cross sectional area of the circular end portion 10 and reducing the area of the keyway 16 formed between the loops 14 and 15. At the same time the clamp may be slipped over the end of the tubular structural member. The nailing strip 22 may then be inserted between the jaws 12 and 13. Thereafter the key 18 which preferably is provided with a tapered end portion, may be driven into the keyway thus simultaneously enlarging the keyway and causing the circular end portion 10 and the jaws 12 and 13 to clamp down upon the tubular structural member 11 and the nailing strip 22 simultaneously. If desired nail holes 24 may be provided for nailing the strip 22 in place, and these may be in the bottom or side walls of the jaws, or both, in which case inturned flanges 26 may if desired be omitted.

Figure 3:
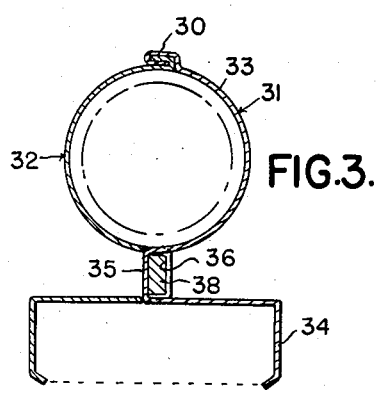
Figure 3 is a transverse section through a connector clamp of somewhat different design.

Alternatively and as illustrated in Figure 3, the connector clamp may be formed of two similar portions adapted to be separated and to be assembled together in use by interfitting hook portions indicated at 30. Similar members 31 and 32 are provided, each of which has a generally semi-circular end portion 33, a clamping jaw portion 34 and intermediate looped portion 35. Again the loops 35 are staggered similar to the portions 14 and 15 in the embodiment illustrated in Figures 1 and 2, and together define a keyway 36 for the reception of a key 38. The advantage of this construction is that the clamp may be assembled around an intermediate portion of a tubular structural member. Otherwise, it operates in identical manner with the embodiment illustrated in Figures 1 and 2.

Figure 4:
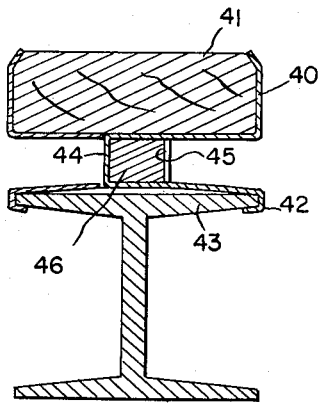
Figure 4 is a transverse section through a somewhat different type of connector clamp employed to support a nailing strip to an I-beam.

Referring now to Figure 4 there is illustrated a third embodiment of the present invention. In this case the connector clamp comprises two like elements, each of which has a first clamping jaw 40 at one end thereof which may be shaped to interfit with the nailing strip 41, a second clamping jaw 42 at the opposite end thereof which may be shaped to interfit with a structural member such for example as the flange 43 of the I-beam illustrated. The intermediate portions of the clamp elements are shaped to provide interfitting loops 44, these loops being staggered in the same manner as in the previously described embodiments and arranged to together define a keyway 45 for the reception of a key 46. In this case as will be obvious from an inspection of the figure, it is necessary only to make a rough assembly of the clamping elements so as to provide the keyway 45 and thereafter to drive the key 46 home, thus effecting a simultaneous clamping of the connector to the flange 43 of the structural member and the nailing strip 41.

In practice it is found satisfactory to provide a keyway and cooperating key which are of substantial uniform cross section from end to end, although it is preferable to taper the end of the key to facilitate entrance into the keyway. However, it is within the contemplation of the present invention to so shape the looped intermediate portions of the clamps so as to provide keyways which are gradually tapered from end to end, and to provide a corresponding taper to the keys. This permits somewhat greater tolerance in the design of the parts since the clamping ends of the clamp are continuously closed as the tapered key is driven further into the keyway.

One of the advantages of the present invention is that a nailing strip may be supported from metal structural elements in such a manner that a floor, wall, or the like may be nailed to the wooden nailing strip in such a manner that the fastening elements are insulated from the structural parts of the building. Thus material nailed to the nailing strip supported by the clamps is effectively insulated from metal parts exposed to cold air at the exterior of the building, and heat loss, with the development of cold spots at the interior, is prevented.

Figure 5:
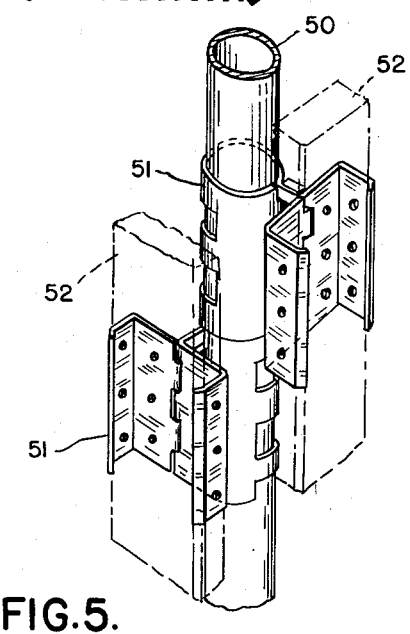
Figure 5 is a perspective view of a plurality of connector clamps supporting a plurality of nailing strips to a tubular structural member, the nailing strips being angularly disposed with respect to each other about a tubular structural member.

Referring now to Figure 5 the manner of employing the improved connector clamps in a building construction whose frame work consists of tubular elements is illustrated. In this figure, a vertical tubular structural element is illustrated at 50 and it may be assumed that this is a corner post of a building. A plurality of connector clamps indicated generally at 51 are provided in suitable pairs or larger groups, each group being arranged to support a nailing strip 52. It will be observed that the nailing strips 52 are disposed at an angle of 90 degrees with respect to each other about the axis of the tubular structural member 50. Accordingly, walls may be nailed to the connector strip 52 and the edges of the walls may be brought into juxtaposition so as to provide a complete enclosure.

It will be observed that the key 46 shown in Figure 4 is illustrated as of a substantial greater width than the keys 18 and 38 illustrated in the first two embodiments described. In some cases it may be desirable to employ a relatively wide key so as to afford substantial support to the nailing strip against rocking movement, and it is within the scope of the present invention to extend the width of the keys in all cases to any desired amount. Thus for example, if desired the key 46 could be of any width up to the width of the jaws 40 and 42 although such extreme width would not as a practical matter be necessary. As a matter of fact, the width of the key may be rather small in most cases since the nailing strips are supported against torque relative to their structural supporting member by the frame work which is nailed thereto.

Figure 6:
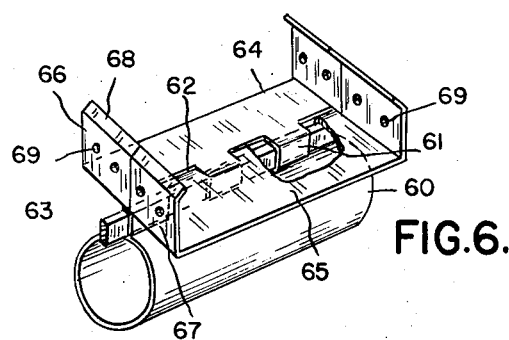
Figure 6 is a perspective view of a modified clamp effective to support a strip in crossed relation to a tube or other support.

In Figure 6 there is illustrated a modified clamp in which the jaws engaging the nailing strip are disposed to support the strip at right angles to the tubular or other support. The portion 60 may be of circular cross-section to embrace a tubular member or of other cross-section as desired. Looped portions 61 and 62 operate as in the modification described above and define a keyway which receives a locking key 63. Jaws 64 and 65 have end flanges 66 and 67 respectively. In this case the edges of flanges may be provided with inturned portions 68 if desired, or these may be omitted and the nailing strip secured by nailing through nail holes 69.

The present connector clamps are particularly well adapted for the rapid framing of buildings, the frame work of which is constituted by tubular structural members. The nailing strips may be easily and quickly attached to the tubular supporting members as described in the foregoing and the building completed by nailing the framing thereto in the usual manner.

Inasmuch as the jaws which grip the nailing strips have inturned lips for retaining the nailing strips securely thereto, and since the nailing strips are supported against a metallic surface constituted by the bottoms of the jaws, the framing may be nailed to the nailing strips and interlocked therewith by employing nails of sufficient length to penetrate through the nailing strip and to be bent over or clenched at the under side thereof as they contact the metal surface of the connector clamp.

The drawings and the foregoing specification constitute a description of the improved connector clamp in such full, clear, concise and exact terms as to enable any person skilled in the art to practice the invention, the scope of which is indicated by the appended claims.

What I claim as my invention is:

1. A unitary clamp having a doubled end shaped to embrace an elongated structural member, an interlooped intermediate portion defining a keyway enlargeable to effect reduction of size of the doubled end to grip a structural member, the other end of said clamp shaped to define a channel for receiving a nailing strip, and a key insertable in said keyway, said channel being formed by a pair of jaw members movable toward each other to grip a nailing strip as the key is inserted to enlarge the keyway, the channel being generally parallel to the structural member gripped by the doubled end.

2. A connector clamp having a first clamping end shaped to fit a structural member, an opposite end shaped to fit a second structural element, the intermediate portion of said clamp shaped to provide interfitting looped parts defining a keyway enlargeable to effect clamping of said ends, and a key insertable in said keyway to clamp said ends, the portions of the looped parts intermediate the keyway and shaped ends being disposed to abut directly the key and the adjacent structural member at one end and the key and the adjacent structural element at the other end whereby the key constitutes a rigid mechanical abutment in the assembly between the structural member and the structural element.

3. A connector clamp formed of relatively wide metal strip having a first clamping end shaped to fit closely around a major portion of an elongated structural element of uniform cross-section for a substantial distance therealong equal to the width of said strip, the opposite end of said clamp being shaped to fit closely around a major portion of a second elongated structural element of uniform cross-section for a substantial distance therealong equal to the width of said strip, the portion of said clamp intermediate said clamping ends being formed of two plies of metal strip slotted to form straps, the straps of each ply being shaped to extend through the slots of the other ply to define a restricted keyway extending transversely of said clamp, and a key insertable endwise into said keyway to enlarge said keyway and to effect clamping of both of said ends.

4. A clamp as defined in claim 3 in which one of said clamping ends is shaped completely to surround the structural element engaged thereby.

5. A clamp as defined in claim 4 in which said clamp is formed of a single piece of metal strip.

6. A clamp as defined in claim 4 in which said clamp is formed of two pieces of metal strip having releasable hooks located at the clamping end thereof which is shaped completely to surround the structural element engaged thereby.

WALKER C. MORROW.

References Cited in the file of this patent

UNITED STATES PATENTS

| Number | Name | Date |
|---|---|---|
| 106,527 | Woodruff | Aug. 16, 1870 |
| 978,398 | Rischard | Dec. 13, 1910 |
| 1,618,527 | Griffiths | Feb. 22, 1927 |
| 1,878,497 | Lehr | Sept. 20, 1932 |
| 1,891,431 | Markart | Dec. 20, 1932 |
| 1,976,913 | Beauchamp | Oct. 16, 1934 |
| 2,161,185 | Mills | June 6, 1939 |
| 2,193,994 | Weaver | Mar. 19, 1940 |
| 2,232,191 | Venzie | Feb. 18, 1941 |
| 2,281,151 | Granger | Apr. 28, 1942 |
| 2,303,108 | Blackburn | Nov. 24, 1942 |

FOREIGN PATENTS

| Number | Country | Date |
|---|---|---|
| 529,514 | Germany | July 14, 1931 |
| 352,820 | Great Britain | July 16, 1931 |
| 48,527 | France | Dec. 9, 1937 |